April 10, 1962  E. T. LESSIG  3,028,903

TIRE CONSTRUCTION

Original Filed March 25, 1954

INVENTOR.
EDWARD T. LESSIG
BY W. A. Shira, Jr.
ATT'Y

United States Patent Office 3,028,903
Patented Apr. 10, 1962

3,028,903
TIRE CONSTRUCTION
Edward T. Lessig, Cuyahoga Falls, Ohio, assignor to The B. F. Goodrich Company, New York, N.Y., a corporation of New York
Original application Mar. 25, 1954, Ser. No. 418,604, now Patent No. 2,902,073, dated Sept. 1, 1959. Divided and this application Apr. 30, 1959, Ser. No. 809,979
6 Claims. (Cl. 152—362)

This invention relates to pneumatic tire constructions and, more particularly, to tires having improved chafing and/or flipper strips, this application being a division of my copending application Serial No. 418,604, filed March 25, 1954, which issued September 1, 1959, as Patent No. 2,902,073.

Conventional tire constructions at the present time employ a carcass of rubber, or other elastomer, and cords with the wheel rim engaging portions or beads reinforced by circumferentially extending cores of wire or other relatively rigid material. These bead cores are covered by strips of fabric known as flipper strips that extend upwardly into the sidewalls of the tire and stiffen the latter. Over the exterior of the tire carcass in the regions of the beads and extending at least partially about the latter are chafing or finishing strips which are intended to resist abrasion of the tire by the rim flanges on which the tire is mounted. These flipper and chafing or finishing strips are generally formed of woven fabric, the cords of which comprise a plurality of fibers or filaments twisted together.

An object of the invention is to provide an improved fabric for the chafer and/or flipper strips of a pneumatic tire wherein the cords of the fabric are formed of twisted continuous filament synthetic fibers with the longitudinally extending interstices between the individual fibers substantially filled by a composition containing polymerized molecules having both polar groups and curing groups so that bonding of the fibers to rubber of the tire is facilitated and passage of air along and through the cords is prevented.

Other and further objects and advantages of the invention will be apparent to those skilled in the art to which it pertains from the following detailed description of the presently preferred embodiment thereof, described with reference to the accompanying drawing forming a part of this application and in which.

Figure 1:
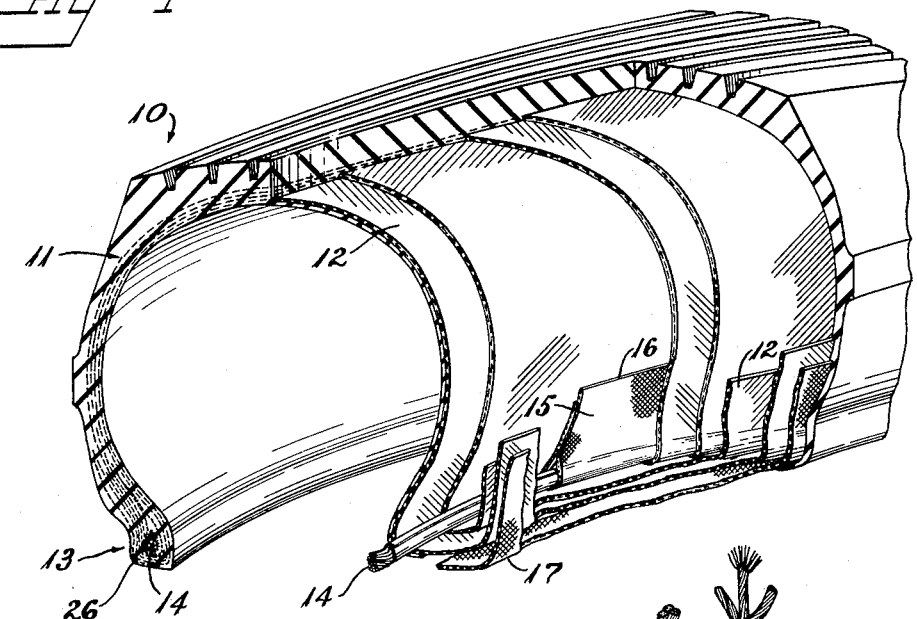
FIG. 1 is a fragmentary perspective view of a portion of a pneumatic tire embodying the invention with parts of the tire being broken away at different locations to more clearly reveal the construction.

The pneumatic vehicle tire illustrated in FIG. 1 as incorporating the invention includes a tread portion 10 surrounding an inner carcass 11 of resilient rubber or other elastomeric material and reinforcing filaments, such as the cord plies 12, the inner periphery of the tire being defined by the spaced bead portions 13. These bead portions include the usual cores 14, here shown as a plurality of circumferentially extending wires. Each bead core 14 has a flipper strip 15 disposed thereabout with the ends of the strip 15 extending unequal distances radially of the sidewall of the tire so that at least one edge, such as 16, of the strip is disposed outwardly of the location at which the periphery of the rim flange of the wheel, on which the tire is mounted, engages the bead region of the tire. The ends of the reinforcing cord plies 12 extend around the bead cores and flipper strips as is well known in the tire building art and one or more chafing or finishing strips 17 are provided externally of the plies. These chafing or finishing strips extend beneath the bead regions 13 to protect the tire from rim chafing due to flexing and other relative movement between the tire and the rim on which it is mounted.

Figure 2:
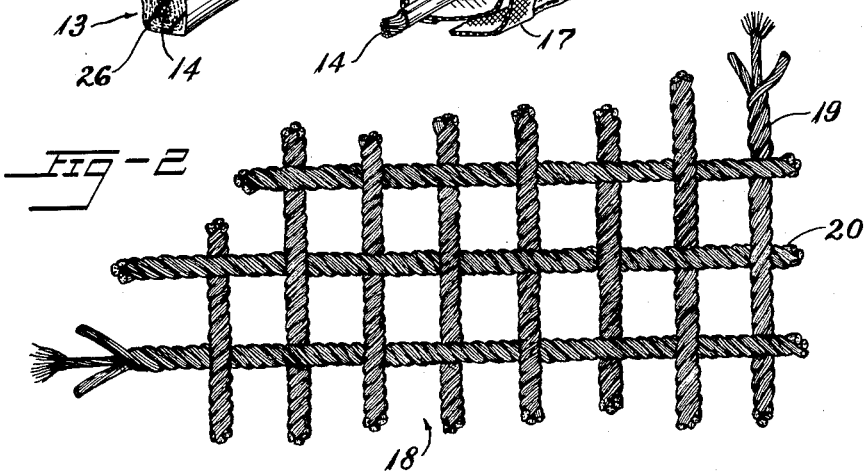
FIG. 2 is an enlarged and exaggerated plan view of a portion of the improved fabric employed in the chafer and/or flipper strips of the tire illustrated in FIG. 1.

In accordance with this invention, the chafing or finishing strips 17 and/or the flipper strips 15 are formed of a woven fabric 18 having warp cords 19 and weft cords 20 intersecting each other at an angle of substantially 90°, see FIG. 2. The fabric 18 is preferably of the open weave type. That is, the cords of the fabric 18 are spaced from each other, as shown to an exaggerated extent in FIG. 2. By way of example, but without limitation thereto, the cords comprising the fabric 18 may be rayon, nylon, or other synthetic fibers and, preferably, the cords are formed from bundles of continuous filaments twisted together to form strands or plies which, in turn, are twisted to form the cords. The twist imparted to the individual strands is preferably not of a high order.

One suitable fabric having the above-mentioned characteristics comprises cords of nylon, the single yarns of which are 210 denier with a twist of ¾ turn to the inch, three such yarns being cabled to form cords having seven turns to the inch, and the cords then woven into a fabric having twenty-seven of the cords per inch in each direction. Another suitable fabric comprises cords the single yarns of which are 420 denier having a twist of ¾ turn to the inch with two such yarns cabled with a twist of seven turns to the inch and with the number of cords per inch such that the open spaces comprise 10% to 30% of the total area of the fabric. As a further example, 840 denier yarn may be twisted to more than six turns per inch and employed as a single yarn cord for the warp and weft cords in a fabric having the aforementioned open weave. These specific examples are, of course, only illustrative of the weights of yarns and twists thereof which may be utilized, and it will be understood that the invention is not limited thereto.

The fabric 18 may be prepared for incorporation into the pneumatic tire by dipping the latter into a suitable preparation which increases the adherence of the cords to the rubber or other elastomers. Such material may, for example, comprise the well-known dispersion of latex in resorcinol formaldehyde solution; a dispersion or solution of acid catalyzed resorcinol formaldehyde and butadiene vinyl pyridine copolymer coupled with a subsequent treatment in an aqueous dispersion of latex; a solution or dispersion of resorcinol formaldehyde with neoprene or with bromine containing isoolefin-polyolefin interpolymer; or other materials comprising polymerized molecules containing both polar groups and curing groups. Generically expressed, the cord-treating materials are those comprising polymerized molecules which provide both polar linkage between molecules by electrostatic attraction and curing linkage, at the double valence bonds, of the type commonly referred to as vulcanization.

Figure 3:
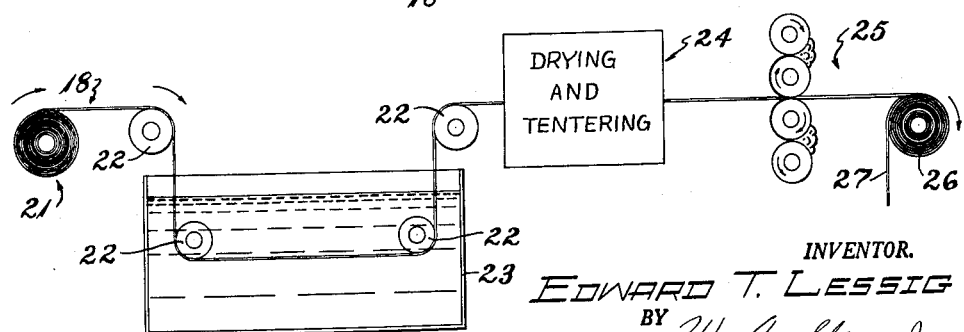
FIG. 3 is a schematic illustration of the manner in which the fabric shown in FIG. 2 is treated prior to incorporation into a tire.

The treatment is preferably effected by dipping the fabric 18 in the solution or dispersion and then allowing the dipped fabric to dry in the manner schematically indicated in FIG. 3. Thus, the fabric 18 may be led from a roll 21 thereof over direction-changing rollers, such as 22, and through a tank or vat 23 containing the treating solution or dispersion. The fabric emerging from the tank or vat passes through a conventional drying apparatus 24 which may include a tentering frame or the like to prevent unequal shrinkage of the fabric as is well known in the art. After passing through the drying apparatus 24, the material is supplied with rubber or other elastomer by passing the same through a conventional calender 25, this operation preferably being performed in sequence immediately after the drying step. The fabric may then be directly used in a tire building operation or may be wound upon a roll 26 with a holland cloth or the like 27 between layers of the fabric 18.

The use of various adhesives or treating substances, such as resorcinol formaldehyde in an aqueous latex dispersion or similar materials, has been employed heretofore for facilitating adhesion of rubber or the like to the fabric. However, in accordance with conventional procedures, this treatment is effected at a rate such that there is generally no appreciable penetration of the solution into or between the fibers and the coating produced thereon is only surface in nature. Consequently, the interstices between the fibers of the cords are not substantially filled so that air can permeate lengthwise of the cords, even though the latter be embedded in a body of rubber. This is an objectionable feature especially in tires of the tubeless variety since the cords of the chafing or finishing strips formed of such fabric would act as small wicks or tubes for conducting air from the interior of the tire to the exterior thereof.

In accordance with this invention, this difficulty is obviated by employing as the fabric for the flippers and finishing or chafing strips, cords made from synthetic fibers of the continuous filament type so that no air can pass through the individual fibers themselves. Furthermore, the treatment of the cords with any of the aforementioned solutions is not simply a surface coating operation as heretofore practiced. On the contrary, the fabric 18 is passed through the solution at a speed such that it can penetrate into the interstices between the fibers of the cords substantially filling the said interstices so that no air can diffuse or pass through the cords when the fabric has been dried and incorporated into a tire. Therefore, the treatment with the solution not only facilitates the union of the cords with the rubber on the tire, but also makes the fabric impervious to the passage of air and, hence, even if the ends of the cords in the finishing or chafing strips should be exposed during use of a tire embodying the same, no air can leak from the interior of the tire lengthwise of the cords, nor can moisture penetrate the cords and damage the tire.

In employing the improved fabric of this invention for the chafing or finishing strips and/or for the flipper strips, the fabric is so applied that the individual cords thereof form an angle with a radius of the tire, which angle is preferably in the order or 45°. Hence, the strength of the sidewalls is substantially the same in all directions. Where extra strength is desired, more than one chafing or finishing strip 17 formed of the fabric 18 may be employed with the several strips disposed so that the cords thereof angularly intersect each other in the manner which is well known in the tire building art. It will be evident that the chafing or finishing strips 17 may either extend entirely around the bead region 13 or may only extend on the outer side of the sidewall of the tire and under the bead heel. These and other conventional procedures normally employed in the construction of tires may be utilized in tires incorporating the improved fabric without departing from the principles of this invention. Consequently, the invention is not to be considered as limited to the exact details and dimensions herein illustrated and described except as may be required by the spirit and scope of the appended claims.

Having thus described the invention, I claim:

1. An inflatable tubeless tire comprised of a hollow annular body of resilient rubbery material open at the radial inner portion and having beads at the inner periphery thereof adapted to seat on a rim so that the tire and rim form an air chamber, each of said beads having a sheet of cords imbedded in and completely surrounded by the rubbery material of the tire and folded around and positioned in close proximity to the surfaces of the bead which engage the bead seat and rim flange of the rim, each said cord having interstices whereby in the untreated condition it is normally pervious to air along its length and terminating at one end at a location adjacent to the toe portion of a bead and at the other end at a location adjacent to a sidewall of the tire to form support for the surfaces of a bead resting on the rim, said interstices being completely filled with a rubbery cord-to-rubber bonding agent which bars the passage of air along the length of said cords whereby air is prevented from escaping from said air chamber along the cords to deflate and injure the tire.

2. An inflatable tubeless tire comprised of a hollow annular body of resilient rubbery material open at the radial inner portion and having beads at the inner periphery thereof adapted to seat on a rim so that the tire and rim form an air chamber, each of said beads having a sheet of cords embedded in and completely surrounded by the rubbery material of the tire and folded around and positioned in close proximity to the surfaces of the bead which engage the bead seat and rim flange of the rim, each said cord having interstices whereby in the untreated condition it is normally pervious to air along its length and terminating at one end at a location adjacent to the toe portion of a bead and at the other end at a location adjacent to a sidewall of the tire to form support for the surfaces of a bead resting on the rim, the said interstices throughout each cord containing a rubbery cord-to-rubber bonding agent which bars the passage of air along the length of said cords whereby air is prevented from escaping from said air chamber along the cords to deflate and injure the tire.

3. An inflatable tubeless tire comprised of a hollow annular body of resilient rubbery material open at the radial inner portion and having beads at the inner periphery thereof adapted to seat on a rim so that the tire and rim form an air chamber, each of said beads having a sheet of fabric formed of spaced bundles of filaments embedded in and completely surrounded by the rubbery material of the tire and folded around and positioned in close proximity to the surfaces of the bead which engage the bead seat and rim flange of the rim, each of said bundles of filaments having interstices between the filaments whereby in the untreated condition it is normally pervious to air along its length, at least some of the said bundles of filaments terminating at one end at a location adjacent to the toe portion of a bead and at the other end at a location adjacent to a sidewall of the tire with the fabric forming a support for the surfaces of a bead resting on the rim, the said interstices throughout each bundle of filaments containing a rubbery cord-to-rubber bonding agent which bars the passage of air along the length of said interstices whereby air is prevented from escaping from said air chamber along the filaments to deflate and injure the tire.

4. An inflatable tubeless tire comprised of a hollow annular body of resilient rubbery material open at the radial inner portion and having beads at the inner periphery thereof adapted to seat on a rim so that the tire and rim form an air chamber, each of said beads having a woven fabric of cords embedded in and completely surrounded by the rubbery material of the tire and folded around and positioned in close proximity to the surfaces of the bead which engage the bead seat and rim flange of the rim, each said cord being formed of a plurality of twisted continuous length synthetic filaments having interstices between the filaments whereby in the untreated condition it is normally pervious to air along its length, at least some of the cords of said fabric terminating at one end at a location adjacent to the toe portion of a bead and at the other end at a location adjacent to a sidewall of the tire with the fabric forming a support for the surfaces of a bead resting on the rim, the said interstices throughout each cord being sufficiently filled by a composition containing polymerized molecules having both polar groups and curing groups to prevent passage of air along the length of said cords whereby air is prevented from escaping from said air chamber along the cords to deflate and injure the tire.

5. An inflatable tubeless tire as defined in claim 4 wherein each bead portion has a core covered by a flipper strip embedded in the rubbery material of the tire and formed of fabric identical in nature with that utilized for the said finishing strips.

6. An inflatable tubeless tire comprised of a hollow annular body of resilient rubbery material open at the radial inner portion and having beads at the inner periphery thereof adapted to seat on a rim so that the tire and rim form an air chamber, each of said beads having a fabric formed of spaced bundles of filaments embedded in and completely surrounded by the rubbery material of the tire and folded around and positioned in close proximity to the surfaces of the bead which engage the bead seat and rim flange of the rim, each of said bundles of filaments having interstices between the filaments whereby in the untreated condition it is normally pervious to air along its length, at least some of said bundles of filaments terminating at one end at a location adjacent to the toe portion of a bead and at the other end at a location adjacent to a sidewall of the tire with the fabric forming a support for the surfaces of a bead resting on the rim, the said interstices throughout each bundle of filaments being sufficiently filled by a composition containing polymerized molecules having both groups which effect a polar linkage between molecules by electrostatic attraction and groups which effect a curing linkage at double valence bonds of the molecules to effect bonding of the filaments to the rubbery material and prevent passage of air along the length of said interstices whereby air is prevented from escaping from said air chamber along the filaments to deflate and injure the tire.

References Cited in the file of this patent

UNITED STATES PATENTS

| | | |
|---|---|---|
| 2,601,394 | Hansen | June 24, 1952 |
| 2,844,181 | Riggs et al. | July 22, 1958 |